Patented June 8, 1948

2,442,797

UNITED STATES PATENT OFFICE 2,442,797

PARA-AMINO BENZOIC ACID ESTERS

Arthur C. Cope, Englewood, N. J., assignor to Sharp & Dohme, Incorporated, Philadelphia, Pa., a corporation of Maryland No Drawing. Application October 5, 1943, Serial No. 505,039

4 Claims. (Cl. 260—472)

This invention relates to new esters of benzoic and p-amino benzoic acids which have valuable properties for use as local anesthetics. In general, the new compounds combine high effectiveness with relatively low toxicity and are relatively non-irritating. These new anesthetics may be used by infiltration or injection or for surface anesthesia, for example, for application to the eye.

The new anesthetics are amines, that is, bases, and will ordinarily be used in the form of salts, for example, as a hydrochloride, sulfate, sulfamate, tartrate, glycolate or other salt, as the free bases themselves are quite insoluble in water. The salt should have sufficient solubility in water to be completely soluble in the concentrations used, which are usually of the order of 1% or less, should be capable of proper crystallization, etc. The hydrochlorides and glycolates are among the salts particularly useful for therapeutic purposes.

The new compounds are the esters of benzoic and p-amino benzoic acids with alicyclic amino alcohols in which the alkylene group contains 3 or 4 carbon atoms and the alicyclic group is cyclohexyl or cyclopentyl or a homologue thereof such as methyl, dimethyl, or ethyl cyclohexyl or cyclopentyl, containing not more than 10 carbon atoms. These new compounds may be represented by the type formula

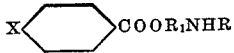

in which R represents an alicyclic group of the type referred to, $R_1$ represents an alkylene group having 3 or 4 carbon atoms and X represents hydrogen or $NH_2$.

It will be noted that these compounds are secondary amines, that is, the amino group of the alicyclic amino alcohol residue is a secondary amino group, two of the hydrogens of ammonia having been replaced.

The new esters of p-amino benzoic acid are prepared by reacting p-nitrobenzoyl chloride or other halide or p-nitro benzoic anhydride with a salt of the alicyclic amino alcohol, and reducing the resulting nitro benzoyl ester, catalytically or otherwise. The benzoic acid esters are prepared by reaction of benzoyl chloride or other halide or anhydride with a salt of the alicyclic amino alcohol. An advantageous process involves condensing the benzoyl compound with salts of secondary alkyl or alicyclic amino alcohols. The alicyclic amino alcohols used as salts for the production of the new compounds are advantageously prepared by condensing the corresponding ketone with the corresponding amino alcohol and reducing. Reference is made to that application for a detailed description of this process.

Because of the convenience of purification and availability of the intermediates, the compounds will ordinarily be prepared by condensing benzoyl or p-nitro benzoyl chloride with the hydrochloride of the alicyclic amino alcohol, and the benzoyl or nitro benzoyl ester produced in the form of the hydrochloride. If another benzoyl halide, for example, a bromide is used, or if the corresponding anhydride is used, other salts of the amino alcohol than the hydrochloride may be used. The esters of alicyclic-amino alcohols which are tertiary alcohols are prepared advantageously by reaction of benzoyl or p-nitro benzoyl chloride or other halide or benzoic or p-nitro benzoic anhydride with the amino alcohol to produce an amide, followed by rearrangement of the amide in the presence of an acid to a salt of the ester.

If the nitro ester is produced as the hydrochloride, it may be subjected in that form to reduction to produce the corresponding salt of the p-amino benzoic acid ester and the final product may be purified and used as the hydrochloride. On the other hand, if the p-nitro benzoate is produced as a salt with some other acid, it may be subjected to reduction in such form, or may be converted to the free base and reduced, in which case the final product will be the p-amino benzoate as the corresponding salt or the free base and may be purified and used as such. Further, if the benzoate or p-amino benzoate is produced in the form of a salt with any given acid, it is readily converted to the salt of some other acid, by treatment with alkali to liberate the free base and subsequent neutralization with the desired acid. If the free base is prepared, it may, of course, be converted to the salt with any desired acid by simple neutralization. The conversion of the salt of the benzoate or p-amino benzoate with one acid to the salt with another acid, or to the free base, or the neutralization of the free base to form salts, involve procedures which are well known to those skilled in the art and require no detailed description herein.

The invention will be further illustrated by the following specific examples, but it is not limited thereto.

*Example I.—Preparation of p-amino benzoic acid ester of 2-cyclohexylamino-1-butanol*

17.1 parts of 2-cyclohexylamino-1-butanol are dissolved in 30 parts of chloroform and the solution is saturated with dry hydrogen chloride gas with cooling. 18.6 parts of p-nitro benzoyl chloride dissolved in 30 parts of chloroform are added and the mixture is heated under a condenser in a bath at 50—55° C. for two to four days. The solvent is removed in vacuum and the residual oil is boiled with absolute alcohol. The p-nitro benzoate hydrochloride obtained on cooling is recrystallized from a mixture of absolute alcohol and acetone. The p-nitro benzoate hydrochloride obtained is suspended in 200 to 500 parts of distilled water and hydrogenated in the presence of one part of palladinized charcoal catalyst at room temperature. When reduction is complete, the catalyst is removed by filtration in an atmosphere of carbon dioxide and the filtrate concentrated to dryness in a vacuum. The p-amino benzoate hydrochloride is obtained as a white crystalline salt melting at 216–217° C.

If, instead of the hydrochloride, the free base is desired, it is readily prepared by dissolving or suspending the hydrochloride in a small volume of alcohol, diluting with water and treating with an excess of sodium carbonate. The free base which is liberated is extracted with benzene. If a salt with an acid other than hydrochloric acid is desired, it is simply necessary to add to the solution of the free base, e. g., in benzene, the stoichiometric quantity of any suitable acid, evaporation of the solvent and crystallization giving the pure salt. The glycolate obtained in this way and recrystallized from alcohol and ether melts at 156–157° C.

The corresponding benzoic acid ester is, of course, prepared by condensing benzoyl chloride with the 2-cyclohexyl-amino-1-butanol, with subsequent purification and without subsequent reduction.

*Example II.—Preparation of the p-amino benzoic acid ester of 1-cyclohexylamino-2-methyl-2-propanol*

27.8 parts of p-nitro benzoyl chloride in 140 parts of methylene chloride are added rapidly to a vigorously stirred suspension of 17.1 parts of 1-cyclohexylamino-2-methyl-2-propanol in 200 parts of 5% aqueous sodium hydroxide. The mixture is heated to a temperature sufficiently high to cause refluxing of the methylene chloride for one hour, with vigorous mechanical stirring. The layers are separated and the aqueous layer is extracted once with methylene chloride. The combined methylene chloride solutions are washed twice with water and concentrated to dryness in vacuum. The residue is recrystallized once from benzene, yielding the N-p-nitrobenzoyl derivative of 1-cyclohexylamino-2-methyl-2-propanol, M. P. 150.5–152° C.

10.2 parts of the above amide are dissolved in 200 parts of absolute alcohol. An excess (35 to 75% molar excess is satisfactory) of concentrated aqueous hydrochloric acid is added, and the solution is boiled for five minutes. The solution is cooled and distilled to dryness in vacuum. The residue is dried by adding benzene and again distilling to dryness in vacuum and recrystallized from methyl ethyl ketone. The p-nitro benzoate hydrochloride of 1-cyclohexyl-amino-2-methyl-2-propanol is obtained. Hydrogenation by the method described in Example I, followed by recrystallization of the product from a mixture of absolute alcohol and acetone, gives the p-aminobenzoate hydrochloride of 1-cyclohexylamino-2-methyl-2-propanol, M. P. 187–188° C. (dec.).

In the foregoing example the reduction to form the amino compound is described as carried out by catalytic reduction in water using palladium supported on charcoal as the catalyst. This reduction may be carried out with the use of other liquids, for example, mixtures of water and alcohol, acetic acid and water or other liquids. Other catalysts than palladium, such as platinum, copper chromites, nickel, or the like, may be used with appropriate adjustment of the hydrogen pressure and temperature. If the nitro compound is reduced as a salt which through its acidic reaction would attack base metal catalysts such as nickel or copper chromite, noble metal catalysts are used. Chemical reduction may, of course, be used.

Among the benzoic and p-amino benzoic esters of alicyclic amino alcohols which are included in the invention and have valuable properties for local anesthetic uses are the esters of the following:

1-cyclohexylamino-2-propanol
1-(4-methylcyclohexyl)-amino-2-propanol
2-cyclohexylamino-1-butanol
2-cyclohexylamino-2-methyl-1-propanol
1-cyclohexylamino-2-methyl-2-propanol
3-cyclohexylamino-1-propanol
2-cyclohexylamino-1-propanol
1-cyclopentylamino-2-propanol
1-(3-ethylcyclopentyl)amino-2-propanol
1-(4-ethylcyclohexyl)amino-2-propanol
1-cyclopentylamino-2-methyl-2-propanol
2-cyclopentylamino-2-methyl-1-propanol
2-cyclopentylamino-1-butanol
2-(4-methylcyclohexyl)amino-1-butanol
3-cyclopentylamino-1-propanol
2-cyclopentylamino-1-propanol and others in which the alcohol radical has three or four carbon atoms and the alicyclic group not more than ten. In general, the compounds which are derived from alicyclic amino alcohols in which the alicyclic amino group and the hydroxyl group are linked to contiguous carbon atoms, both in the case of the propanol derivatives and the butanol derivatives, are superior to the compounds in which these two groups are linked to different carbon atoms which in turn are separated by one or two other carbon atoms.

I claim:

1. As new therapeutic agents p-amino benzoic acid esters of alicyclic amino alcohols of the formula

in which R is a hydrocarbon alicyclic group having from 5 to 10 carbon atoms, the ring structure of which has from 5 to 6 carbon atoms and $R_1$ is an alkylene group having from 3 to 4 carbon atoms.

2. The p-amino benzoate of 1-cyclohexylamino-2-methyl-2-propanol.

3. The p-amino benzoate of 2-cyclohexylamino-1-propanol.

4. The p-amino benzoate of 2-cyclohexylamino-1-butanol.

ARTHUR C. COPE.

REFERENCES CITED

The following references are of record in the file of this patent:

UNITED STATES PATENTS

| Number | Name | Date |
|---|---|---|
| 1,513,730 | Adams et al. | Nov. 4, 1924 |
| 1,590,792 | Adams et al. | June 29, 1926 |
| 2,139,818 | Goldberg | Dec. 13, 1938 |
| 2,252,713 | Goldberg | Aug. 19, 1941 |